United States Patent
Rice et al.

(10) Patent No.: US 7,717,047 B2
(45) Date of Patent: May 18, 2010

(54) FRICTION DRIVE POPULATION CONTROL FOR A PLANTER

(75) Inventors: Haydon Rice, Asquith (CA); Leonard Bettin, LaGrange Park, IL (US)

(73) Assignee: CNH America LLC, New Holland, PA (US)

( * ) Notice: Subject to any disclaimer, the term of this patent is extended or adjusted under 35 U.S.C. 154(b) by 128 days.

(21) Appl. No.: 12/029,725

(22) Filed: Feb. 12, 2008

(65) Prior Publication Data

US 2009/0199750 A1 Aug. 13, 2009

(51) Int. Cl.
*A01C 7/00* (2006.01)
*A01C 9/00* (2006.01)
*A01C 15/00* (2006.01)

(52) U.S. Cl. .................. 111/177; 111/200; 111/921; 111/922; 111/925

(58) Field of Classification Search .......... 111/130–133, 111/11–14, 170–188, 200, 921, 922, 925–927
See application file for complete search history.

(56) References Cited

U.S. PATENT DOCUMENTS

| 2,282,205 A | 5/1942 | Olsen |
| 2,742,196 A | 4/1956 | Grether |
| 2,792,970 A | 5/1957 | Gaiman |
| 2,829,896 A | 4/1958 | Swenson |
| 3,266,728 A | 8/1966 | Hallberg |
| 3,334,760 A | 8/1967 | Bolinger et al. |
| 4,029,237 A | 6/1977 | Miconi |
| 4,193,547 A | 3/1980 | Ballu |
| 4,235,376 A | 11/1980 | Cohen et al. |
| 4,256,261 A | 3/1981 | Gurney |
| 4,449,648 A | 5/1984 | Gustavsson |

FOREIGN PATENT DOCUMENTS

DE 198 02 427 A 1 7/1999

*Primary Examiner*—Christopher J. Novosad
(74) *Attorney, Agent, or Firm*—Rebecca L. Henkel; John William Stader

(57) ABSTRACT

A friction drive for an agricultural planter has a linear actuator, which may be hydraulically or pneumatically controlled, to selectively raise or lower a drive wheel into frictional engagement with a carrying wheel. A valve network is fluidly associated with the linear actuator and allows the operator or pilot to variably define the degree of frictional engagement. This allows the operator to vary the amount of frictional engagement of the drive wheel and the carrying wheel, the output of which is used by a material dispensing system to deposited planting material onto a planting surface.

17 Claims, 4 Drawing Sheets

# FRICTION DRIVE POPULATION CONTROL FOR A PLANTER

FIELD OF THE INVENTION

The present invention relates generally to agricultural implements, and in particular, to a tow-behind planter having a friction drive that allows an operator to compensate for the amount of torque generated by a material metering system to account for different planting surface conditions and/or types of planting material.

BACKGROUND OF THE INVENTION

Conventional agricultural planters include a tow behind material dispensing implement that deposits planting material, such as seed and fertilizer, onto a furrowed farmland or similar planting surface. The implement may consist of multiple dispensing units that are supported by a common or shared frame that is towed by a tractor or similar vehicle. The dispensing units, commonly referred to as row units, for some planters may be grouped into two sets—a left side set and a right side set. Each of these sets may be independently controlled, which allows the operator to selectively dispense material from either of the left and right side units or both.

Each dispensing unit is associated with a material hopper and includes a material metering system that regulates the flow of material from the associated material hopper. The amount of material that is deposited is generally a function of the rotational speed of the seed meter. The rotational speed is transmitted from a transmission assembly that includes a friction or drive wheel that is maintained in frictional engagement with a carrying wheel. A planter will typically include at least two carrying wheels that collectively support the planter above the planting surface. For material to be deposited, the drive wheel and the carrying wheel must be engaged with one another.

The dispensing units of a planter can be separated into multiple sets, with each set associated with a respective friction drive. The transmissions can be separately controlled using electric clutches. Thus, when the transmissions are both engaged, all the dispensing units are allowed to deposit material onto the planting surface. When one or both of the transmissions are disengaged, the respective dispensing units will not deposit material onto the planting surface. This effectively allows the operator sectional on/off control during the planting or fertilizing process.

The rotational speed set by the transmissions controls how much material is deposited. Generally, if no rotation is transmitted by a transmission, i.e., from a disengaged transmission, the dispensing units associated therewith will not dispense any material. As noted above, an electric clutch can be used to disengage a transmission, but is also possible for no torque to be transmitted even when the transmission is engaged. During wet or muddy conditions, the carrying wheel may slip. Similarly, when the carrying wheel engages an obstruction and is momentarily suspended above the planting surface, no rotation is transmitted by the transmission. For rotation to be transmitted, the drive wheel must be rotated. Thus, when the carrying wheel is slipping, rotation is not passed through to the metering system resulting in no material being deposited. Conventional friction ground drive planters have used springs mounted to the frame to pull the drive wheels down into frictional engagement with the carrying wheels. Since the pull strength of the springs is constant, the degree of frictional engagement, if any, cannot be varied. As a result, there is very little flexibility in adjusting to match the operating conditions and torque generated by the seed meters. For example, during ideal operation conditions, less frictional engagement may be tolerated as the operator may not be expecting the carrying wheel to slip. For normal operation, the carrying wheel must overcome the bias placed thereon by the drive wheel to rotate and propel the planter forward. If the bias is set for less than ideal operating conditions however, more work is required for the towing vehicle to pull the planter. On the other hand, if the bias is set for ideal conditions, it may be difficult to plant or fertilize effectively during non-ideal conditions, such as wet or otherwise muddy conditions.

Additionally, the amount of torque required to drive the material metering systems is not universal for all seeds and granular fertilizers. For example, for some planters, more torque may be required for dispensing cotton seed than corn seed.

SUMMARY OF THE INVENTION

The present invention is directed to a friction drive for an agricultural planter whereby linear actuators are used to adjustably control the amount of frictional engagement between a drive wheel and a carrying wheel to meet varying environmental conditions and material types.

The linear actuators, which may be hydraulically or pneumatically controlled, include a double acting cylinder having an extendable ram that can be selectively actuated to raise or lower the associated drive wheel into frictional engagement with the carrying wheel. The linear actuator may also incrementally vary the position of the drive wheel and thus adjust the degree of frictional engagement between the drive wheel and the carrying wheel. A valve network is fluidly associated with the linear actuators and allows the operator or pilot to selectively and independently control the frictional engagement of each drive wheel with its associated carrying wheel.

It is thus on object of the present invention to provide an agricultural planter having independent and adjustable seed metering slip tolerance control.

It another object of the invention to provide an adjustable friction drive for an agricultural planter.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION OF THE PREFERRED EMBODIMENTS

Figure 1:
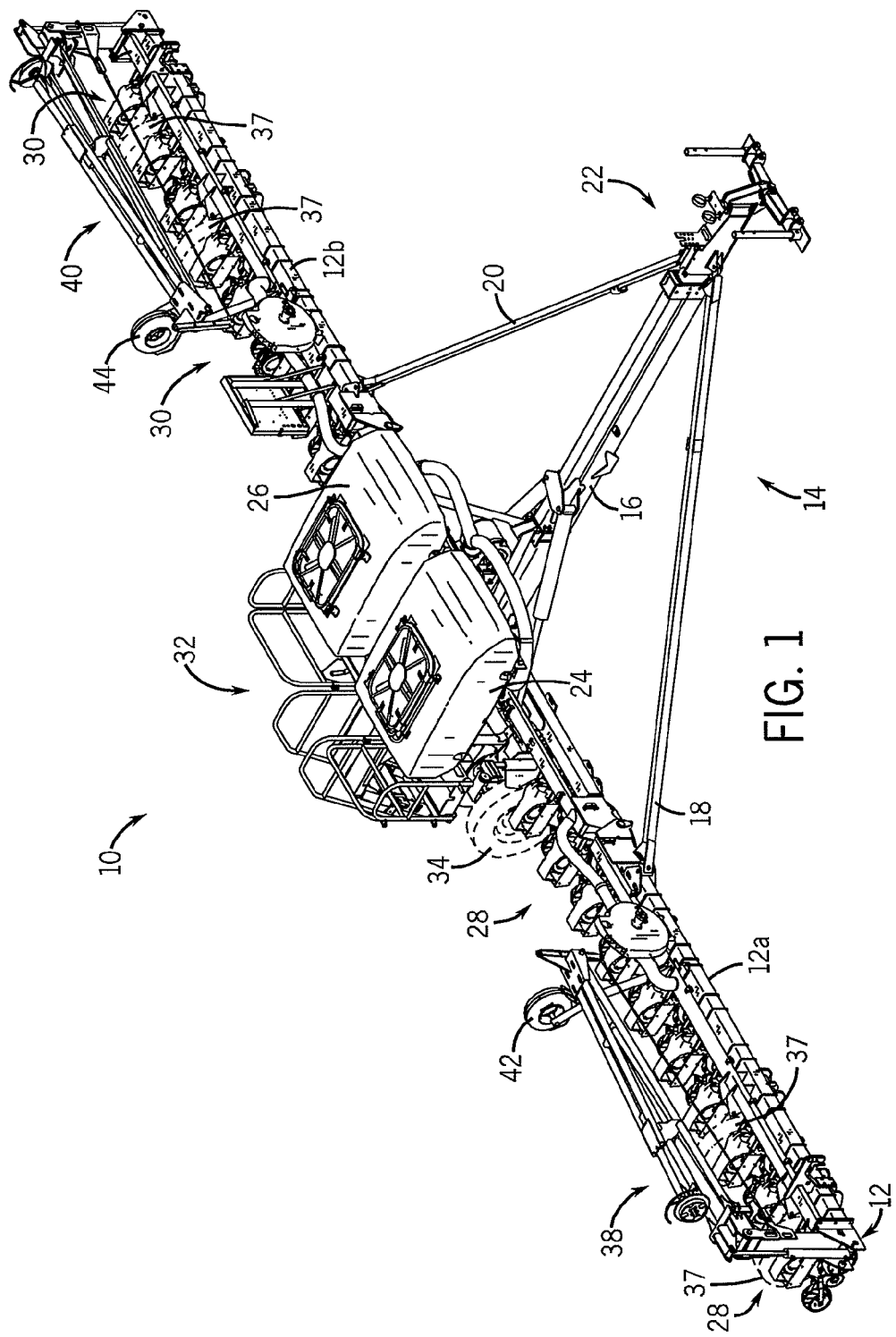
FIG. 1 is a perspective view of an agricultural planter incorporating a friction drive assembly according to one embodiment of the present invention.

An agricultural planter 10 according to one embodiment of the present invention is shown in FIG. 1. In the illustrated embodiment, the planter 10 is a front folding planter, but it is understood that the present invention may be used with other types of planters. The planter 10 has a frame 12 that extends generally transverse to a path of travel. The frame 12 carries a yoke 14 that includes a center beam 16 and a pair of support arms 18, 20. The center beam 16 and the support arms 18, 20 are connected to a hitch assembly 22 for coupling the planter 10 to a tractor (not shown) or similar towing vehicle.

The frame 12 also supports a pair of tanks 24, 26 that carry seed, fertilizer or other planting material to be deposited onto the planting surface. Planting material is fed from the tanks 24, 26 in a conventional manner to two sets of row or dispensing units 28, 30, respectively. The row units 28, 30 are spaced linearly along the frame 12 and include a material dispensing port associated with a material hopper, farrow opener, and a packer wheel, as known in the art. One skilled in the art will appreciate that material is fed from the tanks 24, 26 to the individual material hoppers of each row unit. As will be described, a material metering system controls the dispensing of material from the individual hoppers. A platform 32 is mounted to a rearward portion of the frame proximate the tanks 24, 26 to enable a loader to fill the tanks 24, 26 with seed and/or fertilizer when desired. Alternately, each of the row unit hoppers (not shown) may be individually filled.

The frame 12 and its components are supported above the planting surface by four center carrying wheels 34, 56, 58, and 60 (only one of which is visible in the figure) and four outer carrying wheels (all of which are designated by reference numeral 37) that support the wings 12a, 12b, of the frame 12. The frame 12 includes a pair of foldable markers 38, 40 with each including a marker wheel 42, 44, respectively, as is also known in the art, that are supported by the wings 12a, 12b when retracted (as shown in FIG. 1).

Figure 2:
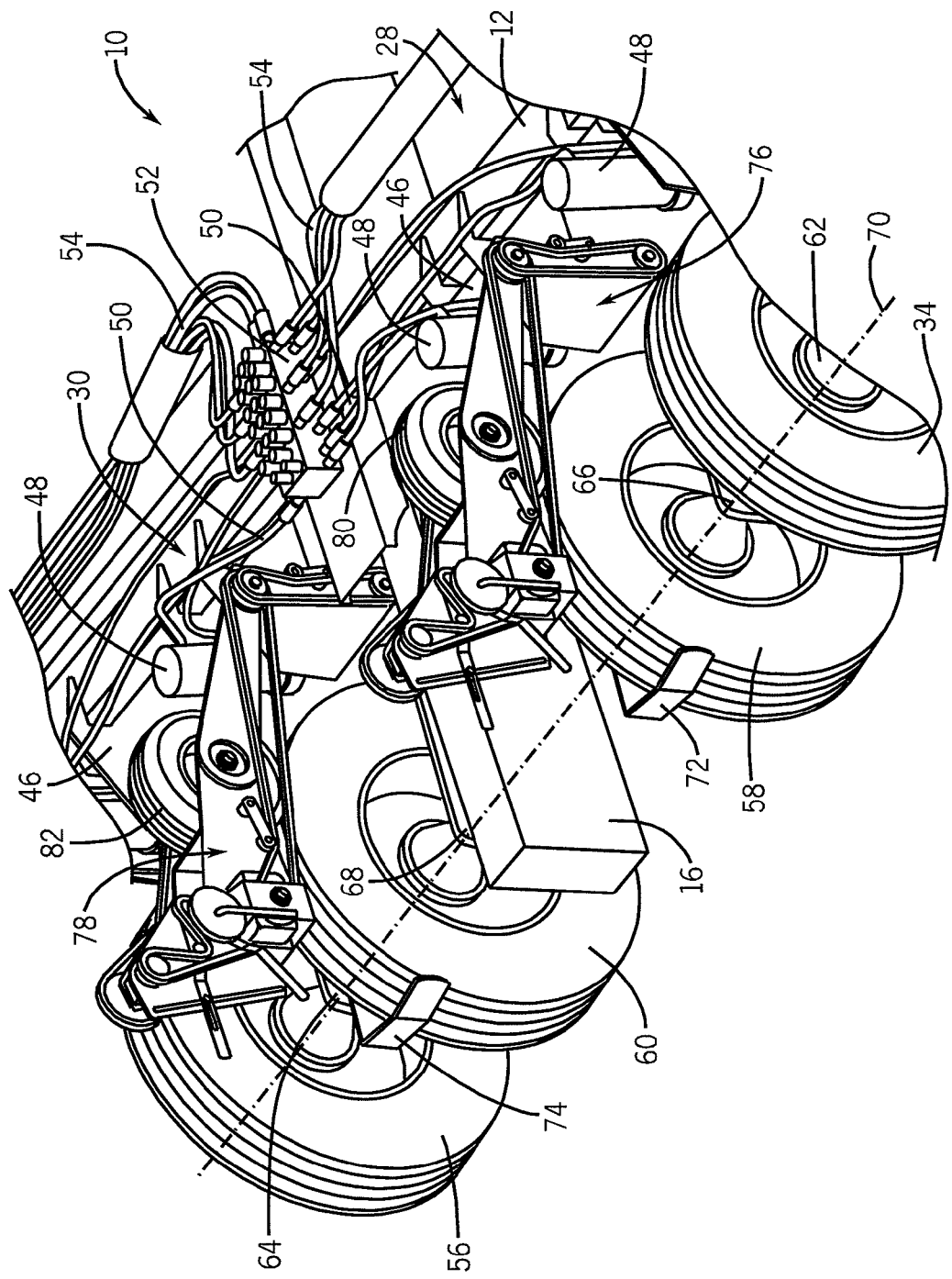
FIG. 2 is an enlarged perspective view of a portion of the agricultural planter of FIG. 1 showing a pair of friction drives according to the present invention.

Referring now to FIG. 2, the sets of row units 28, 30 are separated by the center beam 16 that sits centrally beneath the pair of tanks 24, 26. In this regard, the planter 10 includes a left side set of row units 28 supported by wing 12a and a right side set of row units 30 supported by wing 12b. As will be described, each set of row units can be independently controlled to provide the operator some flexibility in the distribution of planting material onto the planting surface.

As also shown in FIG. 2, the rearward side 46 of the frame 12 carries hydraulic cylinders 48 that may be actuated to lift or lower the entire frame assembly as a single unit, as known in the art, to disengage or engage the row units from or with the planting surface. Hydraulic fluid is circulated to the cylinders 48 by hoses 50 that are coupled to manifold 52. As shown in the figure, additional hoses 54 are also coupled to the manifold for circulating hydraulic fluid to other hydraulically controlled components of the planter 10 as is known in the art.

In FIG. 1, a carrying wheel 34 is shown rearward of the frame 12 and positioned generally beneath tank 24. This carrying wheel 34 is one of four carrying wheels that support the center section of the planter 10 above the planting surface. The additional carrying wheels are shown in FIG. 2 and include the aforementioned carrying wheel 34 as well as carrying wheel 56 and a pair of inner carrying wheels 58, 60.

In this regard, carrying wheels 34, 56 are perimeter wheels. Each of the wheels 34, 56, 58, and 60 is mounted to the frame 12 by a respective mounting arm 62, 64, 66, and 68. The mounting arms 62-68 center the wheels 34, 56, 58, and 60 about a common axis 70. Scraper blades 72, 74 are mounted to the frame 12 and remove soil and debris buildup from the interior wheels 58, 60. It is understood that the other wheels may also have scrapers to remove soil and debris therefrom.

The frame 12 also supports a pair of transmissions 76, 78 with one associated with each set of the interior wheels 58, 60, respectively. The transmissions 76, 78 transmit rotation to the material dispensing metering systems (not shown) to control the amount of the material that is dispensed by the row units. More particularly, the transmissions 76, 78 are each linked with a respective friction drive wheel 80, 82 that may be biased downwardly to engage carrying wheels 58, 60 respectively. In operation, the friction or drive wheels 80, 82 are caused to rotate in anti-rotation with their associated carrying wheels 58, 60. This results in rotation being generated by each of the friction wheels 80, 82, which is transmitted by the transmissions 76, 78, respectively, to the seed metering systems in a known manner.

The amount of torque that can be transmitted through the transmissions 76, 78 is a function of the degree of friction created by the engagement of the drive wheels 80, 82 with the carrying wheels 58, 60, respectively. Thus, the greater the downward bias placed on the drive wheels 58, 60 the greater the degree of frictional engagement formed therebetween. Conversely, the amount of frictional force between the wheels is reduced as the drive wheels 80, 82 are lifted away from the carrying wheels 58, 60, respectively.

Figure 3:
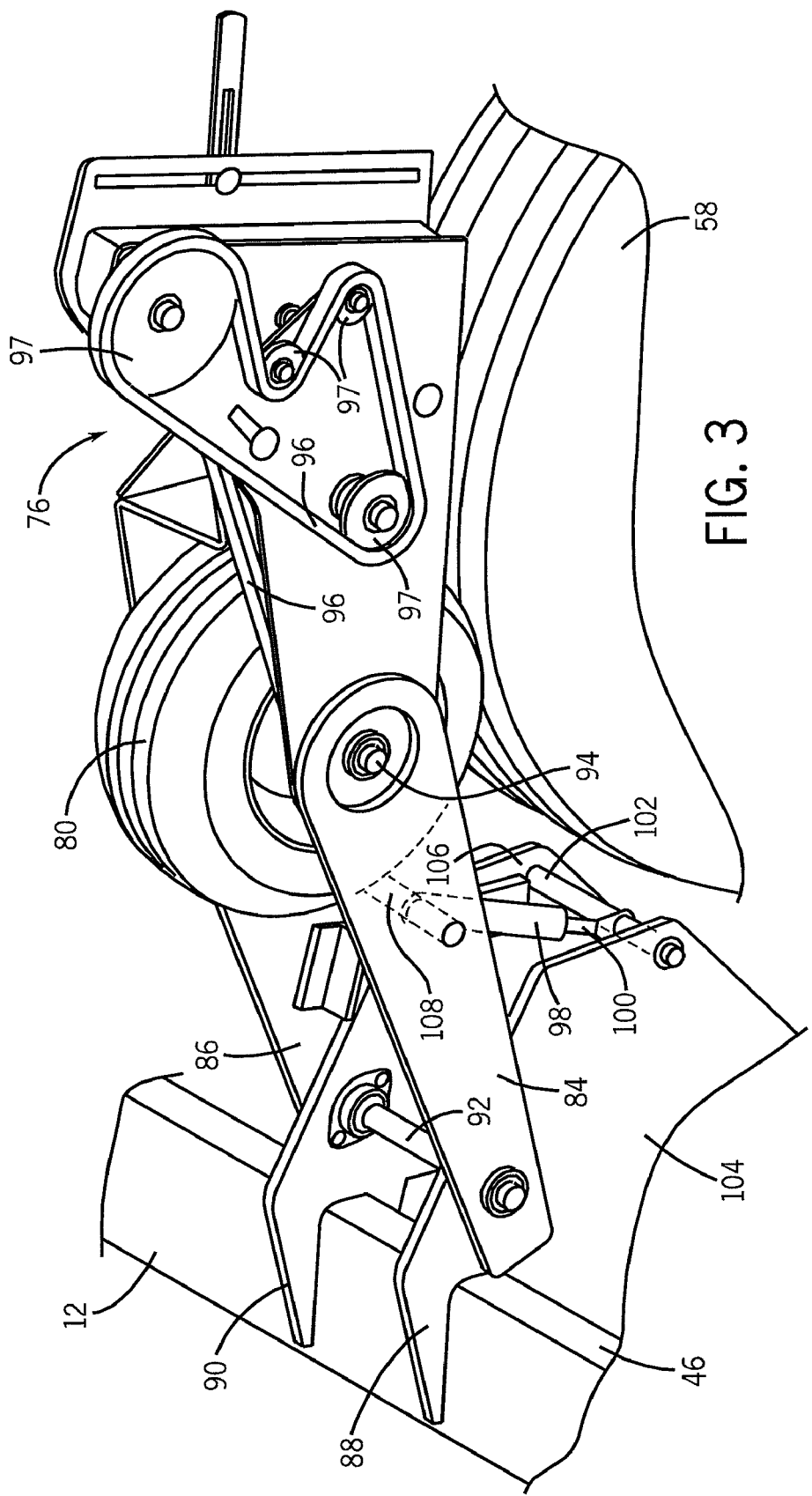
FIG. 3 is a perspective view of one of the friction drives shown in FIG. 2.

Referring now to FIG. 3, one of the transmissions and its associated friction drive is shown. It is understood that both transmissions are similarly constructed and are similar in their operation, but for purposes of illustration, transmission 76 is shown and will be described.

The friction drive is mounted to the frame 12 with a pair of spaced linkage arms 84, 86. More particularly, the rearward side 46 of the frame 12 has a pair of rearward flanges 88, 90 to which the linkage arms 84, 86 are coupled using a mounting pin 92. This mounting allows the linkage arms 84, 86 and thus the friction drive to rotate or pivot relative to the frame 12.

The friction drive includes drive wheel 80, which is also mounted to the linkage arms 84, 86 via axle 94. This allows the drive wheel 80 to rotate. Transmission 76 is also coupled to the axle 94 and includes a series of chains 96 and sprockets 97 that, when engaged, rotate with rotation of the drive wheel 80. The output speed of the transmission, determined by the combination of sprockets used, controls the seed population at the respective material metering system (not show) as known in the art.

As further shown in FIG. 3, a fluid cylinder 98 is operably associated with an extendable ram or piston 100 to adjust the frictional engagement between the drive wheel 80 and the carrying wheel 58. The extendable ram 100 is coupled to a transverse member 102 that extends between a pair of mounting plates 104, 106 extending from the rearward side 46 of the frame 12. The cylinder 98 is coupled to a transverse member 108 (shown hidden) extending between the pair of linkage arms 84, 86. The position of the transverse member 102 is fixed whereas the transverse member 108, by its connection to the linkage arms 84, 86, moves with the linkage arms 84, 86.

More particularly, the ram 100 may be extended to place a pushing force on the transverse member 108. This pushing force upwardly biases the transverse member 108 and causes the linkage arms 84, 86 to pivot about pivot pin 92 and thus rotate relative to the frame 12. With enough upward bias, the drive wheel 80 can be completely disengaged from the carrying wheel 58 so that no frictional engagement is present between the drive wheel 80 and the carrying wheel 58. When the drive wheel 80 is disengaged from the carrying wheel 58, no rotation is transmitted to the material metering system and thus no material is deposited by the associated row units. Conversely, the extendable ram 100 may be retracted, which imposes a pulling force on the transverse member 108. This results in downward rotation of the linkage arms 84, 86 and thus the drive wheel 80. With sufficient downward rotation, the drive wheel 80 will contact the carrying wheel 58. With increased downward bias, the degree of engagement between the wheels 58, 80 will increase thereby increasing the frictional force necessary for the carrying wheel 58 to anti-rotate the drive wheel 80, and increasing the available torque to the material metering system.

The cylinder 98, which may be hydraulically or pneumatically controlled, together with ram 102 can thus incrementally adjust the amount of frictional engagement between the drive wheel 80 and its carrying wheel 58. As a result, the amount of torque available to be transmitted by the transmission 76 can be varied in real-time to account for varying environmental conditions and/or material types. In other words, the operator can adjustably account for slip and non-slip conditions through adjustment of the amount of downward bias placed on the drive wheel 80. Further, the operator can adjust the frictional bias as a function of the type of material to be dispensed, e.g., more bias for cotton and less bias for corn. In one representative embodiment, the cylinder 98 is a hydraulic cylinder connected to a hydraulic fluid source using various hoses and couplings, as known in the art.

Figure 4:
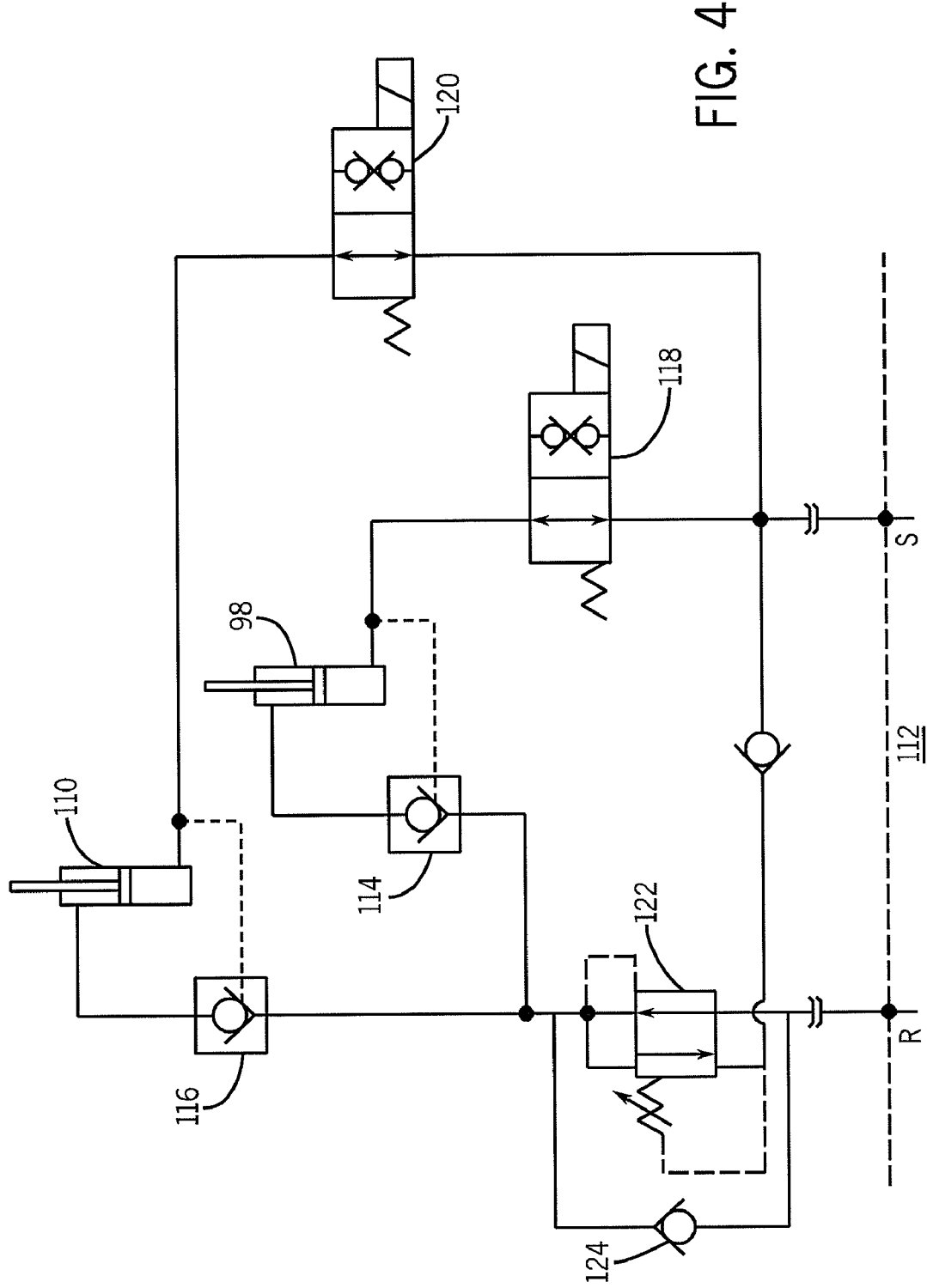
FIG. 4 is a schematic of a fluid circuit for controlling the frictional engagement of a friction drive wheel and a carrying wheel according to one embodiment of the present invention.

FIG. 4 shows a schematic for a hydraulic circuit for controlling the hydraulic pressure imposed on the hydraulic cylinders described above. The circuit includes the aforedescribed right side cylinder 98 as well as a similarly constructed left side cylinder 110. Each cylinder is supplied with a hydraulic fluid via ports (S) and (R) from fluid reservoir 112 in a controlled manner, as will be described.

The right and left sides of the circuit each contain the aforementioned cylinders 98, 110 and pilot operated check valves 114, 116, respectively, that hold the pressure in cylinders 98, 110, respectively. The circuit farther includes right and left side solenoids 118, 120, respectively. The solenoids 118, 120 may be independently energized to effectively turn OFF or turn ON a respective side of the circuit. That is, when solenoid 120 is energized, hydraulic fluid is not allowed to flow through the cylinder 110. Similarly, when solenoid 118 is energized, hydraulic fluid does not flow through cylinder 98. This allows the operator, who can selectively energize the solenoids 118, 120 using suitable cab controls, to deposit material with only one of the sets of dispensing units. An adjustable pressure reducing valve 122 is interconnected between the cylinders 98, 100 and the fluid reservoir 112 and is responsive to operator inputs to vary the fluid pressure in the circuit. In this regard, the valve 122 can incrementally adjust the pressure in the cylinders 98, 110 and thus incrementally change the degree of frictional engagement between the drive wheels 80, 82 relative to the carrying wheels 58, 60, respectively. A check valve 124 is connected across the pressure reducing valve 122 is operable to allow the reverse flow of fluid through the pressure reducing valve 122 to port (R).

The aforedescribed hydraulic circuit allows the pilot or operator to place the row units into various states though selective control of the check valves, solenoids, and pressure valve. These states are summarized below:

Toolbar Raise: In this state, the supply port (S) is pressurized and hydraulic fluid is free to flow through the solenoids and extend the rams associated with the cylinders. As a result, both drive wheels are separated from the carrying wheels resulting in a cessation of material being deposited onto the planting surface. It is expected that the pilot will raise the toolbar during turns and other instances in which it is desired to cease material deposition.

Toolbar Lower: After completing a turn, for example, or to otherwise resume material deposition, the return port (R) is pressurized, which causes fluid to flow through the adjustable pressure valve. This limits the pressure that acts onto the cylinders thereby pulling the drive wheels downward into contact with the carrying wheels. The amount of pressure that is allowed to act onto the cylinders can be controlled by the operator via inputs to the pressure reducing valve thereby allowing the operator flexibility in defining the degree of frictional engagement between the drive wheels and the carrying wheels.

Side Shut-Off: During instances when it is desired to shut off half the planting units, such as to avoid excessive overlap, the solenoid for the side to be shut off is energized. For instance, for left side shut off, the right side solenoid is energized. This effectively removes the right side cylinder from the hydraulic circuit. Pressure supplied to supply port (S) causes hydraulic fluid to extend the left side cylinder. This separates the left side drive wheel from the left side interior carrying wheel. No torque is transmitted by the left side transmission and thus no material is deposited by the left side planting units. Pressure is held on the right side cylinder by the pilot operated right side check valve. Thus, the pressure in the cylinder as established by the pressure relief valve is held in the cylinder by its associated check valve.

Normal Both Side Operation: Both ports (S) and (R) are open to the fluid reservoir and the check valves for each cylinder hold the pressure established during the Toolbar Lower state. Thus, both sides of dispensing units deposit material as a function of the rotation generated between the drive wheels and the carrying wheels.

The present invention provides an adjustable friction drive that enables an operator to selectively energize dispensing units of a planter and adjustably control the amount of torque available to the material metering or depositing system. The hydraulic circuit allows the operator to shut-down a transmission when its associated set of planting units is not being used. Additionally, conventional planters can be retrofit to incorporate the disclosed hydraulic circuit thereby eliminating the need to extend special hydraulic hoses between the tractor and the planter. Thus, the hydraulic circuit described above can be plumbed into the lift/fold hydraulic circuit currently found in some planters thereby avoiding the need for a separate hydraulic circuit.

While the present invention has been described with respect to a hydraulic circuit, it is understood that a pneumatic circuit could also be used to selectively and independently raise and lower the drive wheels. It is also understood that fitting the operator cab of the tractor or other towing vehicle to include suitable interfacing controls for the solenoids, check valves, and the adjustable pressure relief valve is known in the art. In one representative embodiment, the planter has twenty-four dispensing or row units, with each side having twelve units, but is understood that the invention is applicable with planters having more or less than twenty-four units. Additionally, while the invention has been described with respect to two friction drives, it is understood that the planter could have more than or fewer than two friction drives. In this regard, the row units of the planter may be grouped into more than or fewer than two groups or sets. For example, the row units of a given wing of the frame could be grouped into multiple groups with separate friction drives, such as described herein, associated with the carrying wheels that support the frame wing.

Many changes and will modifications could be made to the invention without departing from the spirit thereof. The scope of these changes will become apparent from the appended claims.

We claim:

1. An agricultural planting apparatus comprising:
   a frame assembly supporting a plurality of material dispensing units;
   a carrying wheel connected to the frame assembly and adapted to ride along a planting surface and support the frame assembly above the planting surface;
   a drive wheel connected to the frame assembly and operably associated with a material metering assembly that controls an amount of material dispensed by the plurality of material dispensing units, wherein the drive wheel is frictionally engageable with the carrying wheel;
   a linear actuator having a cylinder and an extendable ram, the linear actuator connected to the frame and configured to adjustably bias the drive wheel into frictional engagement with the carrying wheel; and
   an adjustable pressure reducing valve associated with the hydraulic cylinder and configured to adjustably control hydraulic pressure flow to the hydraulic cylinder.

2. The apparatus of claim 1 wherein the linear actuator is a double-acting hydraulic cylinder.

3. The apparatus of claim 1 further comprising a transmission assembly that transmits the torque imparted on the drive wheel to the material metering system.

4. The apparatus of claim 1 wherein the material dispensing units are configured to dispense seed.

5. The apparatus of claim 1 wherein the material dispensing units are configured to dispense granular fertilizer.

6. An agricultural planting machine comprising:
   a frame supporting a first transmission and a second transmission;
   a first set and a second set of material dispensing units supported by the frame and operably associated with the first and the second transmission, respectively;
   a pair of carrying wheels supported by the frame and adapted to ride along a planting surface and suspend the frame above the planting surface;
   a pair of friction wheels supported by the frame, a first friction wheel operatively associated with the first transmission and a second friction wheel operatively associated with the second transmission, and wherein the pair of friction wheels is configured to set an amount of torque transmitted through the first and second transmissions;
   a pair of fluid cylinders supported by the frame and including a first fluid cylinder adapted to control frictional engagement of the first friction wheel with a first carrying wheel and a second fluid cylinder adapted to control frictional engagement of the second friction wheel with a second carrying wheel; and
   an adjustable pressure reducing valve associated with the first and the second fluid cylinders and configured to set the pressure of fluid flowing through the cylinders.

7. The machine of claim 6 further comprising a first pilot operated check valve and a second pilot operated check valve, and wherein the first pilot operated check valve is operative to hold a fluid pressure imposed on the first fluid cylinder and the second pilot operated check valve is operative to hold a fluid pressure imposed on the second fluid cylinder.

8. The machine of claim 6 wherein the first fluid cylinder is configured to control the frictional engagement of the first friction wheel with the first carrying wheel independent of any control imposed by the second fluid cylinder on the frictional engagement of the second friction wheel and the second carrying wheel.

9. The machine of claim 8 wherein each of the fluid cylinders is adapted to disengage a respective friction wheel from any engagement with a respective carrying wheel.

10. The machine of claim 6 wherein the fluid cylinders are hydraulic cylinders.

11. An agricultural planting system comprising:
    a first set and a second set of material dispensing units;
    a first and a second friction wheel and carrying wheel combination associated with the first and the second set of material dispensing units, respectively;
    a first and a second linear actuator associated with the first and the second friction wheel and carrying wheel combinations, respectively; and
    a valve network connected to the first and the second linear actuators and configured to independently and selectively control an amount of bias placed on the first and the second friction wheel and carrying wheel combinations by the first and the second linear actuators, respectively;
    wherein the first friction wheel and carrying wheel combination includes a first friction wheel and a first carrying wheel, and the second friction wheel and carrying wheel combination includes a second friction wheel and a second carrying wheel, and wherein the valve network includes a pressure reducing valve fluidly linked with the first and second linear actuators to adjust an amount of frictional engagement between the friction wheels and the carrying wheels.

12. The system of claim 11 wherein the valve network further includes a first and a second solenoid valve associated with the first and the second linear actuators, respectively, and wherein the first solenoid valve is adapted to control fluid flow to the first linear actuator and wherein the second solenoid valve is adapted to control fluid flow to the second linear actuator.

13. The system of claim 12 wherein the valve network further includes a first pilot operated check valve fluidly linked with the first linear actuator and a second pilot operated check valve fluidly linked with the second linear actuator, and wherein each check valve is pilot operated to limit fluid flow to a respective linear actuator.

14. The system of claim 13 wherein the first pilot operated check valve is configured to limit fluid flow to the first linear actuator independent of a state of the second pilot operated check valve.

15. The system of claim 11 wherein the valve network is configured to individually control the first and the second linear actuators to regulate an amount, if any, of material is dispensed by the first and the second material dispensing units.

16. The system of claim 11 wherein the valve network is configured to control an amount of torque placed on the first and the second transmissions by the first and the second friction wheel and carrying wheel combinations, respectively.

17. The system of claim 11 wherein the first and the second linear actuators are hydraulic cylinders and the valve network controls hydraulic fluid flow to the hydraulic cylinders.

* * * * *